(12) United States Patent
Krampetz et al.

(10) Patent No.: US 12,548,417 B2
(45) Date of Patent: Feb. 10, 2026

(54) SYSTEM AND METHODS FOR DETECTING THEFT FOR BUILDING MANAGEMENT

(71) Applicant: Kimberly-Clark Worldwide, Inc., Neenah, WI (US)

(72) Inventors: Erin K. Krampetz, Woodstock, GA (US); Reilly Howell, Atlanta, GA (US); Aida M. Mokube, Cumming, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 18/294,313

(22) PCT Filed: Aug. 24, 2021

(86) PCT No.: PCT/US2021/047328
§ 371 (c)(1),
(2) Date: Feb. 1, 2024

(87) PCT Pub. No.: WO2023/027692
PCT Pub. Date: Mar. 2, 2023

(65) Prior Publication Data
US 2024/0346897 A1 Oct. 17, 2024

(51) Int. Cl.
*G08B 13/14* (2006.01)
*A47K 10/36* (2006.01)
(Continued)

(52) U.S. Cl.
CPC .......... *G08B 13/14* (2013.01); *A47K 10/3625* (2013.01); *G08B 27/00* (2013.01); *H04W 4/80* (2018.02)

(58) Field of Classification Search
CPC .................................................. G08B 13/14
See application file for complete search history.

(56) References Cited

U.S. PATENT DOCUMENTS

| 5,691,919 A | 11/1997 | Gemmell et al. |
| 5,878,381 A | 3/1999 | Gemmell et al. |

(Continued)

FOREIGN PATENT DOCUMENTS

| CN | 107028539 A | 8/2017 |
| CN | 206910225 U | 1/2018 |

(Continued)

OTHER PUBLICATIONS

PCT Search Report Corresponding to Application No. PCT/US2021/047328 on Nov. 11, 2021.

(Continued)

*Primary Examiner* — Travis R Hunnings
(74) *Attorney, Agent, or Firm* — Dority & Manning, P.A.

(57) ABSTRACT

Systems and methods for detecting theft of one or more consumable products at a plurality of washroom facilities at a commercial location are provided. The system includes one or more product dispensers within each of the washroom facilities that require periodic refill of a consumable product. The system also includes a sensor configured with each of the product dispensers configured to monitor an amount of product consumed from the product dispenser and to generate one or more data signals comprising product usage information. A server system is provided that configured to receive the one or more data signals and to monitor product usage of the dispenser based. The server system is further configured to generate a theft alert upon identification of one or more theft parameters. The one or more theft parameters includes identification of a product usage rate that is an atypical product usage rate for the product dispenser.

19 Claims, 5 Drawing Sheets

(51) Int. Cl.
*G08B 27/00* (2006.01)
*H04W 4/80* (2018.01)

(56) References Cited

U.S. PATENT DOCUMENTS

| | | |
|---|---|---|
| 6,360,181 B1 | 3/2002 | Gemmell et al. |
| 7,044,421 B1* | 5/2006 | Omdoll .................. A47K 10/36 |
| | | 242/563 |
| 7,783,380 B2 | 8/2010 | York et al. |
| 7,814,582 B2 | 10/2010 | Reddy et al. |
| 10,281,166 B1* | 5/2019 | Hutz .................. H04L 12/2825 |
| 10,376,109 B2 | 8/2019 | Fellhoelter |
| 10,392,217 B2 | 8/2019 | Case et al. |
| 10,709,300 B2 | 7/2020 | Mahaffey et al. |
| 10,791,886 B2 | 10/2020 | Borke |
| 10,986,475 B1* | 4/2021 | Grosman ........... G06Q 30/0603 |
| 2019/0029477 A1* | 1/2019 | Borke .................... G05B 15/02 |
| 2019/0335957 A1 | 11/2019 | Hines et al. |
| 2019/0374075 A1* | 12/2019 | Barnett .................... A61L 2/10 |
| 2020/0126654 A1 | 4/2020 | Holmes et al. |
| 2022/0301413 A1* | 9/2022 | Sinha ...................... G01S 1/047 |

FOREIGN PATENT DOCUMENTS

| | | | |
|---|---|---|---|
| CN | 111671347 A | * | 9/2020 |
| DE | 202015103227 U1 | | 9/2016 |
| GB | 2489965 A | | 10/2012 |
| KR | 101046262 B1 | | 10/2009 |

OTHER PUBLICATIONS

Statt, China is fighting toilet paper thieves with facial recognition software, The Verge, 2017, 2 pages.

* cited by examiner

SYSTEM AND METHODS FOR DETECTING THEFT FOR BUILDING MANAGEMENT

RELATED APPLICATIONS

The present application is the national stage entry of International Patent Application No. PCT/US2021/047328 having a filing date of Aug. 24, 2021, which is incorporated herein in its entirety by reference thereto.

BACKGROUND

Commercial buildings can require various tasks for management, maintenance, and/or upkeep. As one example, washrooms and/or other areas in commercial and residential buildings typically include dispensable or otherwise consumable products such as snack foods, drinks, cleaning supplies, toilet tissue, paper towels, diapers, feminine products, liquid hygiene products such as soap, and aerosol products such as air fresheners. These products are typically housed by a dispenser or other container and are dispensed/consumed as needed by the user. Currently, janitors or maintenance personnel roam the buildings in which they are working to service the building, or the janitors or maintenance personnel are sent to service a particular area (e.g., dispenser) after a problem has occurred or for general maintenance. Accordingly, maintenance personnel or other supervisory personnel are not present at all times in washrooms where consumable products are provided. Accordingly, consumable products can be a target for theft. Thus, improved devices and systems for detecting theft of consumable products from product dispensers in commercial settings (e.g., restrooms) are needed.

SUMMARY

Aspects and advantages of embodiments of the present disclosure will be set forth in part in the following description, or can be learned from the description, or can be learned through practice of the embodiments.

Embodiments are directed to a system for detecting theft of one or more consumable products at a plurality of washroom facilities at a commercial location. The system includes one or more product dispensers within each of the washroom facilities that require periodic refill of a consumable product; a sensor configured with each of the product dispensers configured to monitor an amount of product consumed from the product dispenser and to generate one or more data signals comprising product usage information; and a server system configured receive the one or more data signals and to monitor product usage of the dispenser based, at least in part, on the one or more data signals. The server system is further configured to generate a theft alert upon identification of one or more theft parameters. The one or more theft parameters include identification of a product usage rate that is an atypical product usage rate for the product dispenser.

Other embodiments are directed to methods for detecting theft of one or more consumable products at a plurality of washroom facilities at a commercial location. The method includes generating one or more data signals comprising product usage information from one or more sensors disposed on one or more product dispensers; transmitting the one or more data signals to a server system to monitor product usage of the one or more dispensers; and generating a theft alert based, at least in part, on the identification of one or more theft parameters, wherein the one or more theft parameters comprises identification of a product usage rate that is an atypical product usage rate for the product dispenser.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

A full and enabling disclosure of the present disclosure is set forth more particularly in the remainder of the specification, including reference to the accompanying figures, in which.

Repeat use of reference characters in the present specification and drawings is intended to represent the same or analogous features or elements of the present invention.

DETAILED DESCRIPTION

Reference will now be made in detail to one or more embodiments of the invention, examples of the invention, examples of which are illustrated in the drawings. Each example and embodiment is provided by way of explanation of the invention, and is not meant as a limitation of the invention. For example, features illustrated or described as part of one embodiment may be used with another embodiment to yield still a further embodiment. It is intended that the invention include these and other modifications and variations as coming within the scope and spirit of the invention.

The present disclosure is generally directed to system and method for detecting theft for building management. For instance, systems and methods according to example aspects of the present disclosure relate to detecting theft of consumable products from washroom facilities in commercial locations. In particular, washroom facilities in commercial locations (e.g., office buildings) can include number of consumable product dispensers, such as paper towel dispensers, soap dispensers, toilet tissue dispensers, and so forth. Given that maintenance personnel or other staff are not able to constantly monitor washroom facilities, washroom facilities in commercial establishments can become targets for theft. Such theft increases the overall product costs for building management and also for commercial tenants. Additionally, theft of consumable products (e.g., toilet paper and paper towels) prevents users of the washroom facility from accessing the consumable product in a timely manner, which can lead to user frustration and discontent. Additionally, when supply chain disruptions affect the ability of users to procure certain consumable products for their own personal use, the incident of theft of such products from commercial establishments can increase. Accordingly, the present system is configured to generate and transmit a theft alert upon the identification of one or more parameters indicative that a theft has occurred.

Utilization of the systems and methods of the present disclosure can provide for a number of technical effects and benefits. As a first example, the system allows for building management to more accurately determine the specific washroom in which the theft is occurring and can identify the specific dispensers from which the theft is occurring. Also, the system of the present disclosure can provide a more exact time of when the theft is occurring.

Figure 1:
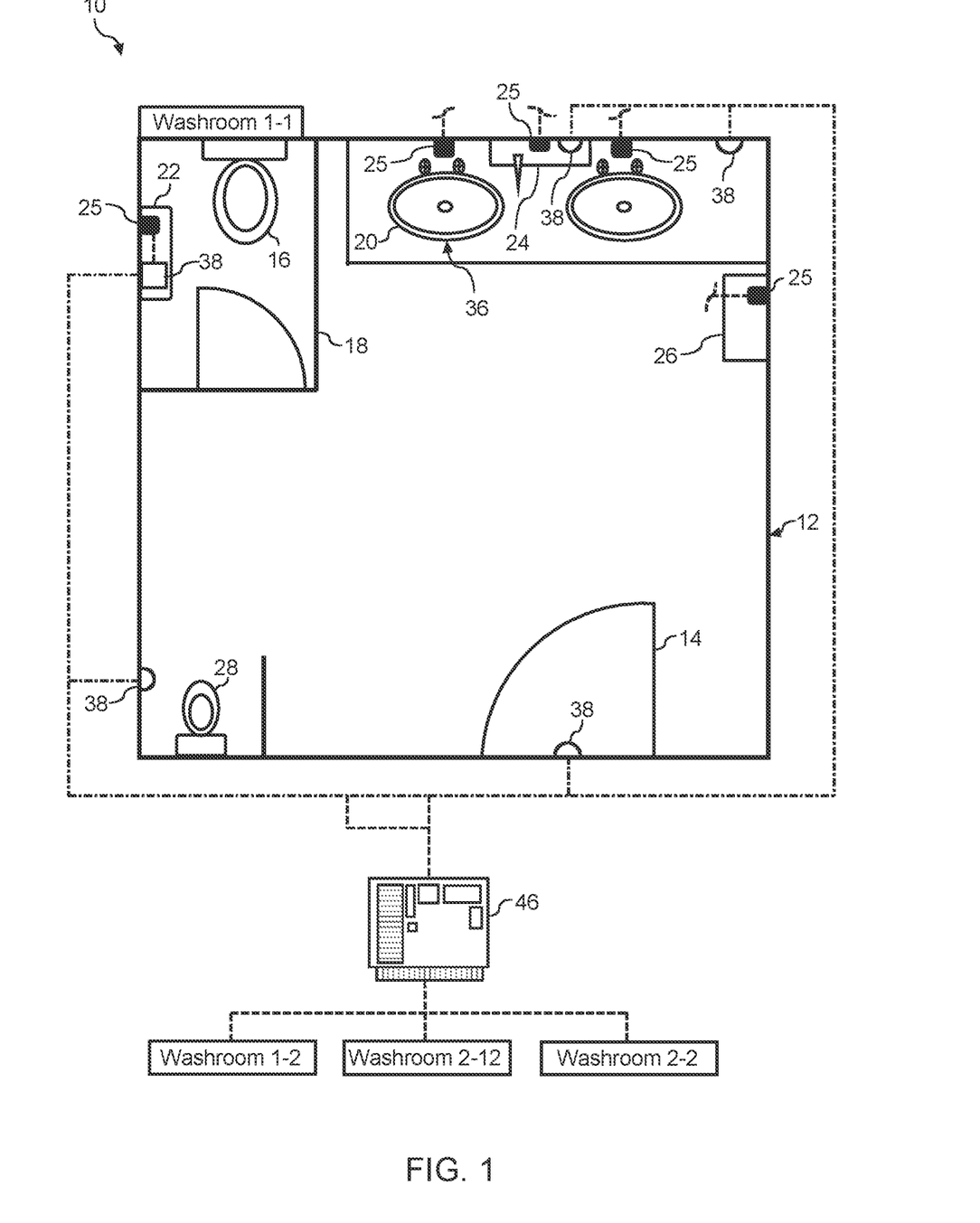
FIG. 1 is a diagram view of a washroom facility incorporating a system and method in accordance with aspects of the present disclosure.

Referring to FIG. 1, an embodiment of a system 10 and related method are illustrated with respect to a public or semi-private washroom facility 12 within a building or business site location. The building may have a plurality of similarly configured facilities 12 on one or multiple floors.

The design and features of the washroom facility 12 depicted in FIG. 1 are for illustrative purposes only. The washroom facility 12 is depicted as a men's restroom facility having one or more individual stalls 18 (with individual toilets 16) and one or more urinals 28. A number of sinks 20 are also provided. Any combination of other conventional washroom components may also be provided in the washroom facility 12, such as toilet tissue dispensers 22, soap dispenser 24, towel dispenser 26, and so forth. Within each washroom facility 12, the product dispensers 22, 24, 26 are configured with a sensor 25 that detects a level or amount condition of the product in the dispenser based on any number of operational principles, such as run time of the dispenser or direct measurement of the amount of product dispensed. Numerous types of these product dispensers are well known in the industry and a detailed explanation thereof is not necessary for purposes of the present disclosure. The product dispensers 22, 24, 26 can be in communication with a monitoring system or can be in communication with a server system 46 (as indicated by the dashed lines in FIG. 1) via any manner of suitable wireless communication system (as indicated by the dashed lines in FIG. 1). If used, a monitoring system can include a computer-implemented system that may be remotely located from the washroom facility 12 or configured within the facility 12. The monitoring system may monitor a number of similarly-configured washroom facilities 12 within a building or business site location. As described, with this particular system 10, any one of the dispensers 22, 24, 26 located in the washroom facility 12 can be in direct communication with a system server 46 (also described in greater detail below). Information from the dispensers 22, 24, 26, such as information from the receivers 38 associated with dispensers and/or other receivers 38, may be used by the server system 46 to monitor the status of the dispensers 22, 24, 26 of the respective washroom facility 12.

Referring to FIG. 1, in certain embodiments, the washroom facility 12 is configured with one or more receivers 38 strategically located throughout the facility. The receivers 38 can be configured to transmit information from the dispensers 22, 24, 26 to the server system 46. The receivers 38 can transmit data signals from the sensors 25 located on the dispensers 22, 24, 26 via one or more wireless protocols. Notably, one or more wireless protocols can be implemented to deliver data between the sensors 25, dispensers 22, 24, 26, and the server system 46. Also, as depicted in FIG. 1, numerous washrooms (e.g., Washroom 1-2, Washroom 2-12, Washroom 2-2, etc.) can be configured in the same manner as Washroom 1-1, having sensors 25 and dispensers 22, 24, 26 therein that are in communication with server system 46.

The server system 46 is in communication with the receivers 38 and/or dispensers 22, 24, 26 and includes a memory with a respective file associated with each of the sensors 25 associated with dispenser 22, 24, 26, and the system 46 is capable of retrieving or opening stored files associated with each sensor 25 in order to identify the particular dispenser and can also determine product usage of each dispenser based on data signals obtained from the respective dispenser 22, 24, 26, as will be discussed further hereinbelow.

Each of the washroom facilities 12 is equipped with wireless communication capability between the sensors 25 their respective dispensers 22, 24, 26, receivers 38, and/or server system 46. In this regard, the washroom facilities 12 are considered to be "communication-enabled" facilities. In certain examples, Bluetooth Low Energy technology is particularly well-suited for purposes of systems 10 in accordance with the present subject matter. For example, the sensors 25 or other data transmission units disposed on or with respect to dispensers 22, 24, 26 may be Bluetooth Low Energy beacons that transmit unique beacon signals as a Bluetooth Low Energy formatted signal, and the receivers 38 are Bluetooth Low Energy scanners configured to receive and recognize the Bluetooth Low Energy formatted signal.

Bluetooth Low Energy beacons are commercially available and are relatively small devices that can be implemented as part of sensor 25 or dispensers 22, 24, 26. Bluetooth Low Energy devices are well-known to those skilled in the art, and a detailed explanation of their function and operation is not necessary for an understanding and appreciation of the present invention. Briefly, Bluetooth Low Energy beacons are a class of low-energy, low-cost radio transmitters that can alert and/or notify a receiver running Bluetooth Low Energy applications of their presence, which in turn enables the receiver to perform certain actions when in close proximity to the beacon. Each Bluetooth Low Energy beacon broadcasts a unique beacon signal using the Bluetooth Low Energy standard format. These unique signals are also known as beacon "advertisements" The Bluetooth Low Energy receiver runs an application that enables the device to scan for and receive the signals within transmitting range of the Bluetooth Low Energy beacons. The receiver will automatically "react" to the received signal and may start other Bluetooth Low Energy-enabled applications for various purposes, including communication with a central server, which in this case is the server system 46.

It should be appreciated that the present systems and methods are not limited to Bluetooth Low Energy technology. The sensors, dispensers, receivers, and/or other wireless devices can implement any suitable wireless protocol to perform wireless communications as described herein. As examples, the wireless protocol can include, but is not limited to, Long Range (LoRa), Near Field Communication (NFC), High-Frequency (HF) RFID, Ultra-High Frequency (UHF) RFID, Ultra-wideband (UWB), Institute of Electrical and Electronics Engineers (IEEE) 802.15.4, Thread, Zigbee, Wirepass, Encoean/ISO/IEC 14543.3.1x, WiFi or IEEE 802.11, cellular services (e.g., 4G Long-Term Evolution (LTE), 5G, etc.), NarrowBand-Internet of Things (NB-IoT), or any other suitable wireless protocols. Other communication technologies are also within the scope and spirit of the disclosure.

As mentioned, certain embodiments will have multiple washroom facilities 12 within a single building or multiple buildings linked to one or more server systems 46 (e.g., a central server system) with each product dispenser and receiver 38 within the multiple of washroom facilities 12 in communication with the server systems 46. In this regard, a communications network is configured for these functions, wherein the individual dispensers are considered as network-enabled devices that may be directly connected to the network through a plurality of direct network links, thereby eliminating the need for the bus, router, or other networking equipment. It should also be appreciated that each of the network enabled devices (or a group of such devices) in this configuration may represent a node that, in turn, may be directly connected and/or multiplexed to the network via the direct network links. Further, the direct network links may represent secure communications channels physically hardened against tampering and/or the communications may be encrypted to prevent unauthorized access to information transmitted thereon.

The server system 46 may include a host computer, which may be an integrated server, or include any manner of periphery server or other hardware structure. The server system 46 may be a single networked computer, or a series of interconnected computers having access to the network via a gateway or other known networking system. Generally, the server system 46 may include a central controller configured to manage, execute and control the individual terminal dispenser units. The server system 46 may include a memory for storing reward program procedures and routines, a microprocessor (MP) for executing the stored programs, a random access memory (RAM) and an input/output (I/O) bus. These devices may be multiplexed together via a common bus, or may each be directly connected via dedicated communications lines, depending on the needs of the system 10.

The server system 46 may be directly or indirectly connected through the I/O bus to any manner of peripheral devices such as storage devices, wireless adaptors, printers, and the like. In addition, a database (DB) may be communicatively connected to the server system and provide a data repository for the storage and correlation of information gathered from the individual dispenser units, receivers, display devices, or nodes of such devices.

It should be appreciated that the network-enabled devices (e.g., the individual dispenser units) may include similar features or may be configured with functionality to allow for an exchange of information required to function as described herein. The network-enabled devices may include a number of internal components, such as a controller having a program memory, a microcontroller or microprocessor (MP), a random access memory (RAM), and an input/output (I/O) bus, all of which may be interconnected via an address or data bus. The server system 46 may include multiple, and even redundant, program memories and random access memories to increase expandability, capacity and/or processing speed.

The program memory and random access memory may be implemented as a solid-state memory, an integrated circuit, a magnetically readable memory, and/or optically readable memories. Further, the program memory may be read only memory (ROM) or may be read/write memory such as a hard disk. In the event that a hard disk is used as the program memory, the data bus may comprise multiple address/data buses, which may be of differing types, and there may be a separate I/O circuit between the data buses.

Network-enabled devices may be distributed throughout a single business establishment and connected with a LAN, or throughout multiple sites and connected with a WAN. Further, the LAN and/or WAN connecting each of the devices may include one or more separate and secure buses, routers, web servers, gateways and other networking equipment to provide continuous and/or redundant connectivity to the network.

It should also be appreciated that the server system 46 or components of the server system can include cloud-based resources. Cloud-based resources and systems are generally known and any suitable cloud-based computing resource can be utilized in the practice of the present disclosure.

Figure 2:
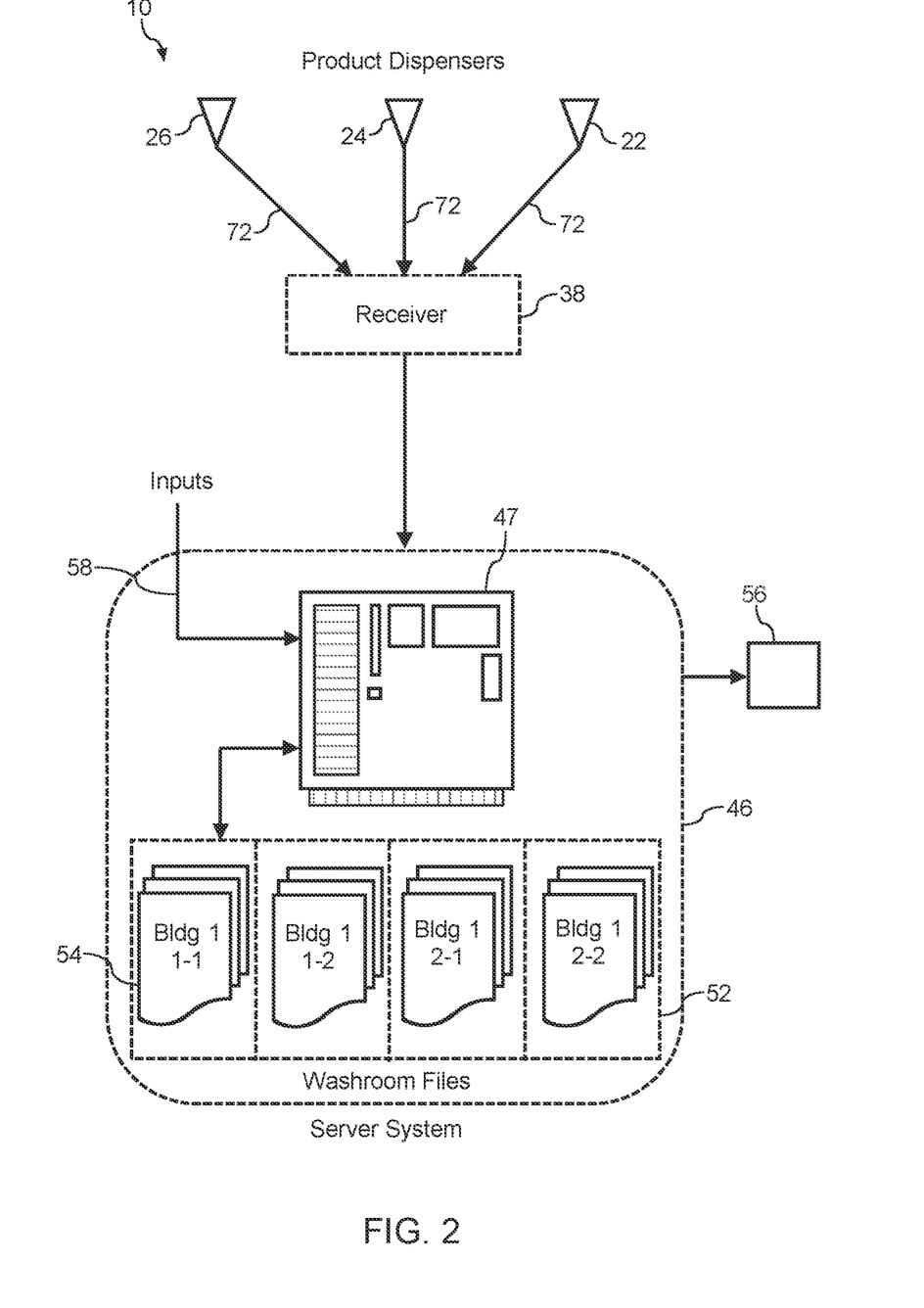
FIG. 2 is a component diagram view of certain control features of a system and method in accordance with the present disclosure.

FIG. 2 is a schematic illustration of certain control aspects of a system 10 in accordance with the invention. In this particular system 10, the server system 46 includes any manner of computer-implemented server 47. The system 46 includes a library 52 in which the washroom facility files 54 are stored. Each file 54 is associated with a particular washroom facility that is also associated with certain sensors 25 and product dispensers 22, 24, 26. As noted above, each dispenser 22, 24, 26 is capable of generating a data signal 72 and ultimately transmitting the data signal to the server system 46. Optionally, in certain embodiments each dispenser 22, 24, 26 transmits the data signal to a receiver 38, which then collects and transmits the data signals to the server system 46. In other embodiments, however, each dispenser 22, 24, 26 can be equipped with one or more receivers 38, such that each dispenser is capable of transmitting the data signals 72 directly to the server system 46. The data signals 72 can include unique Bluetooth Low Energy signals that are received by a Bluetooth Low Energy enabled receiver located within the washroom facility 12. For instance, the Bluetooth Low Energy enabled receivers can be an embodiment of a receiver 38 as discussed with reference to system 10 in FIG. 1. As discussed above, a single receiver 38 may be associated with each washroom facility 12, or a plurality of different receivers 38 may be located throughout the facility 12, for example at each of the dispensers 22, 24, 26 within the facility 12.

Still referring to FIG. 2, the receiver 38 transmits all or a portion of the signals 72 to the server system 46 (e.g., directly, via one or more intermediate devices such as a hub, controller, etc.) while also identifying the particular washroom facility 12, receiver 38, dispenser 22, 24, 26, and/or sensor 25 from which the signals 72 were generated. Further, as noted, the server system 46 is capable of storing one or more washroom files 54. The washroom files 54 can include information regarding each dispenser 22, 24, 26 disposed within the washroom facility. For example, utilizing dispenser 22 as a representative example, data signals 72 from dispenser 22 can be generated and transmitted to the server system 46. These data signals 72 can include information regarding product usage and maintenance of the dispenser. For example, data signals 72 can provide an indication each time product is dispensed from the product dispenser 22. The sensor 25 associated with dispenser 22 is configured to generate one or more data signals 72 indicative of product usage information. For example, dispenser 22 is a toilet tissue dispenser capable of dispensing toilet tissue from one or more rolls of toilet tissue. The toilet tissue dispenser 22 can be equipped with one or more sensors 25 capable of detecting removal of product from the dispenser 22. Such sensors 25 can include those configured to measure rotational increments of the circumference of the rotating member of the dispenser. Certain sensors capable of detecting removal of toilet tissue from the dispenser include those as described in U.S. Pat. No. 6,360,181 B1 to Gemmell et al., which is incorporated herein by reference. Additional sensors can utilize infrared light or other types of light that are capable of detecting removal of product from a roll of sheet material. Such sensors are known and can be incorporated into the dispensers 22, 24, 26 disclosed herein. Such product usage signals can be transmitted to the sever system 46, where they can be stored, aggregated, and/or analyzed according to a variety of processing parameters as will be further discussed herein.

As noted, the server system 46 is capable of receiving the one or more data signals 72 and can aggregate and/or store the data signals 72 in a library 52 containing washroom files 54 for each particular washroom and the associated sensors and dispensers therein. Accordingly, the server system 46 can be utilized to monitor product usage from each dispenser disposed within a washroom facility. In such regards, the sever system 46 receives a signal 72 indicative, at least in part, of product usage from one or more product dispensers 22, 24, 26. The server system 46 can then generate and store a variety of parameters associated with each dispenser 22, 24, 26. For example, the server system 46 can generate a usage rate for each product dispenser 22, 24, 26. In such embodiments, the usage rate can correspond to an amount of product dispensed over a particular period of time. For example, as data signals 72 are received by the server system 46, the server system can aggregate the data signals 72 in order to determine usage rates for each product dispenser 22, 24, 26. Product usage rates can be categorized as normal, referring to a product usage rate that is within parameters observed by the server system 46 for use of product over time, or atypical indicating that product usage from the dispenser is outside the range of normal, including usage that is exceedingly above or below the normal product usage rate for the particular dispenser 22, 24, 26. Furthermore, while usage rates for the product dispensers 22, 24, 26 can be established based on historical data from the data signals 72 by the server system 46, it is also contemplated, that additional inputs 58 can be provided in order to facilitate the establishment of normal usage rates for each product dispenser 22, 24, 26. For example, additional user inputs can be provided including certain parameters to be considered by the server system 46 when determining usage rates for the product dispensers 22, 24, 26.

As noted, FIG. 2 further depicts a number of inputs 58 to the server system 46. For example, any number or type of inputs 58 can be provided to the server system. One example includes inputs 58 labeled "Theft Parameters" that relate to certain parameters or conditions that once identified by the server system 46 indicate that theft of consumable product has occurred. As noted, these inputs 58 may be stored at the server system 46 and can be changed at any time by a user. An example theft parameter includes identification of a product usage rate that is an atypical product usage rate. An atypical product usage rate can refer to a product usage rate that is outside of the range of normal product usage for a particular dispenser. For example, in certain theft situation the atypical product usage rate can correspond to an increased rate of usage. For example, an atypical product usage rate can be at least 1.5 times faster, such as at least 2 times faster, such as at least 2.5 times faster, such as at least 3 times faster, such as at least 3.5 times faster, such as at least 4 times faster, such as at least 4.5 times faster, such as at least 5 times faster than a normal usage rate established for the respective product dispenser 22, 24, 26. For example, in certain theft situations, a known amount of available product is located in the dispenser. In such embodiments, the available quantity of product could be anywhere from 30% remaining to up to 100% remaining. When a theft occurs, the available quantity of product will drop to 0% in a rapid manner. Such a significant drop would be outside of the normal usage rate for the product dispenser, which would then trigger a theft alert by the server system 46. Accordingly, in certain embodiments an example theft parameter can include dispensing a larger quantity of product over a shorter period of time. For example, the theft parameter can include dispensing at least about 30%, such as at least about 40%, such as at least about 50%, such as at least about 60%, such as at least about 70%, such as at least about 80%, such as at least about 90%, such as at least about 100% of product over a specific time period. The time period can range from about 0 seconds to about 300 seconds (e.g., 5 mins), such as from about 1 second to abut 250 seconds, such as from about 2 seconds to about 250 seconds, such as from about 5 seconds to about 200 seconds. In certain embodiments, the time period can range from about 1 second to about 60 seconds. Accordingly, in certain embodiments, the theft parameter can include dispensing at least 50% of product in a time period of less than about 60 seconds. In embodiments, another example of a theft parameter can include identification of one or more product dispensers having an available product quantity of zero. The theft parameter can include identification of a product usage rate outside of the normal usage rate when the commercial establishment is closed. Indeed, the operation hours for each commercial establishment and, thus, each washroom can be input into the server system 46. Accordingly, as the server systems detects increased product usage or activity outside of operating hours for the establishment, this can further serve as an indication that a theft is occurring. Furthermore, the theft parameters can include identification of one or more product refills that are not timely refilled. Other theft parameters can be input into the server system 46 and can be utilized in order to identify theft.

Once the server system 46 has identified that a theft parameter has occurred, a theft alert can be generated. In certain embodiments, the theft alert can include the identity of the particular washroom location and product dispenser where the theft has been identified. Furthermore, the theft alert can include the approximate time that the theft occurred. The server system 46 is configured to transmit the theft alert to one or more devices 56, including one or more peripheral devices. Peripheral devices can include any network-enabled portable device, such as tablets and smart phones, and/or computers (e.g., laptops). The server system 46 is configured to transmit the theft alert via one or more wired or wireless protocols, including, but not limited to, cellular services (e.g., 4G Long-Term Evolution (LTE), 5G, etc.). Other wireless protocols disclosed herein may also be utilized to transmit the theft alert. In certain embodiments, the theft alert may be transmitted only to certain devices 56 that are identified by the server system 46 as approved devices. Additionally and/or alternatively, once the server system 46 has identified that a theft parameter has occurred, the identified dispenser can be disabled. For example, once it has been determined that a theft parameter has occurred and that the dispenser has been tampered with, the server system 46 can disable the dispenser from properly functioning in order to prevent additional theft and/or waste. For example, the system can disable any functional or operational component of the dispenser. Additional measures can also be implemented by the system in order to reduce the chance or likelihood of additional theft occurring from the dispenser. For example, additional lock-out features can be employed in order to secure any remaining dispensable product within the dispenser in order to ensure that further theft does not occur.

Figure 3:
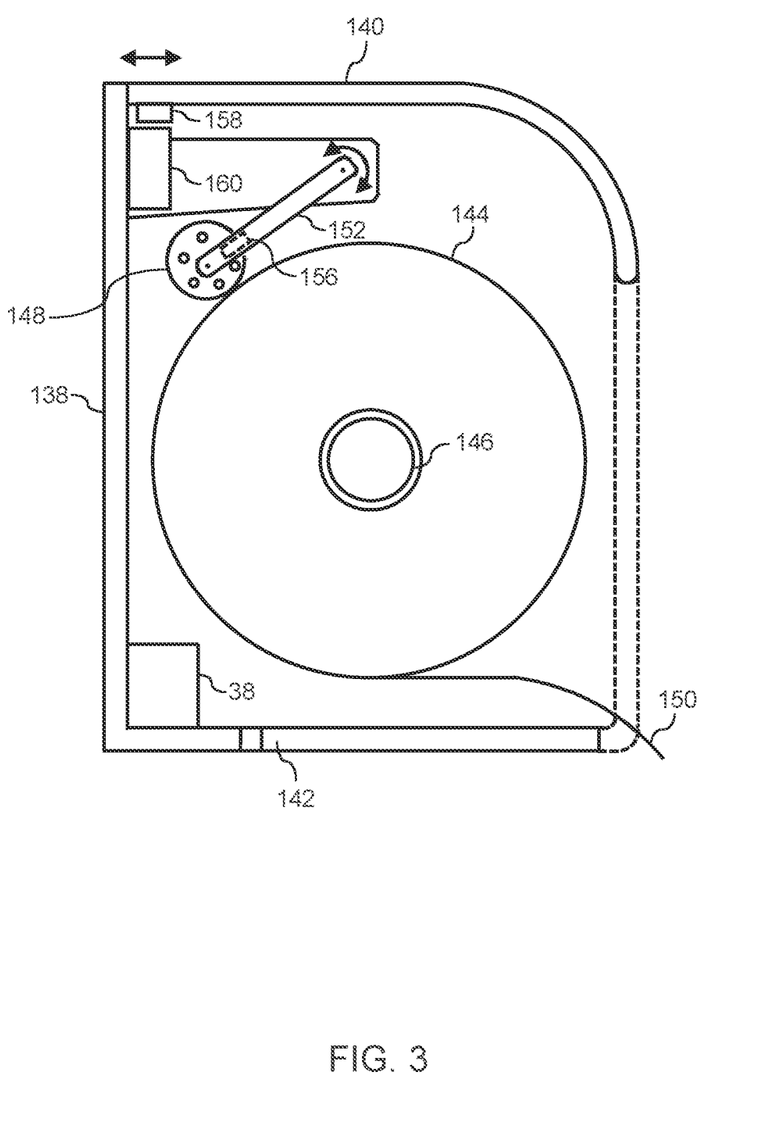
FIG. 3 depicts a partial cross sectional view showing the interior of a dispenser for a rolled sheet product in accordance with the present disclosure.
Figure 4:
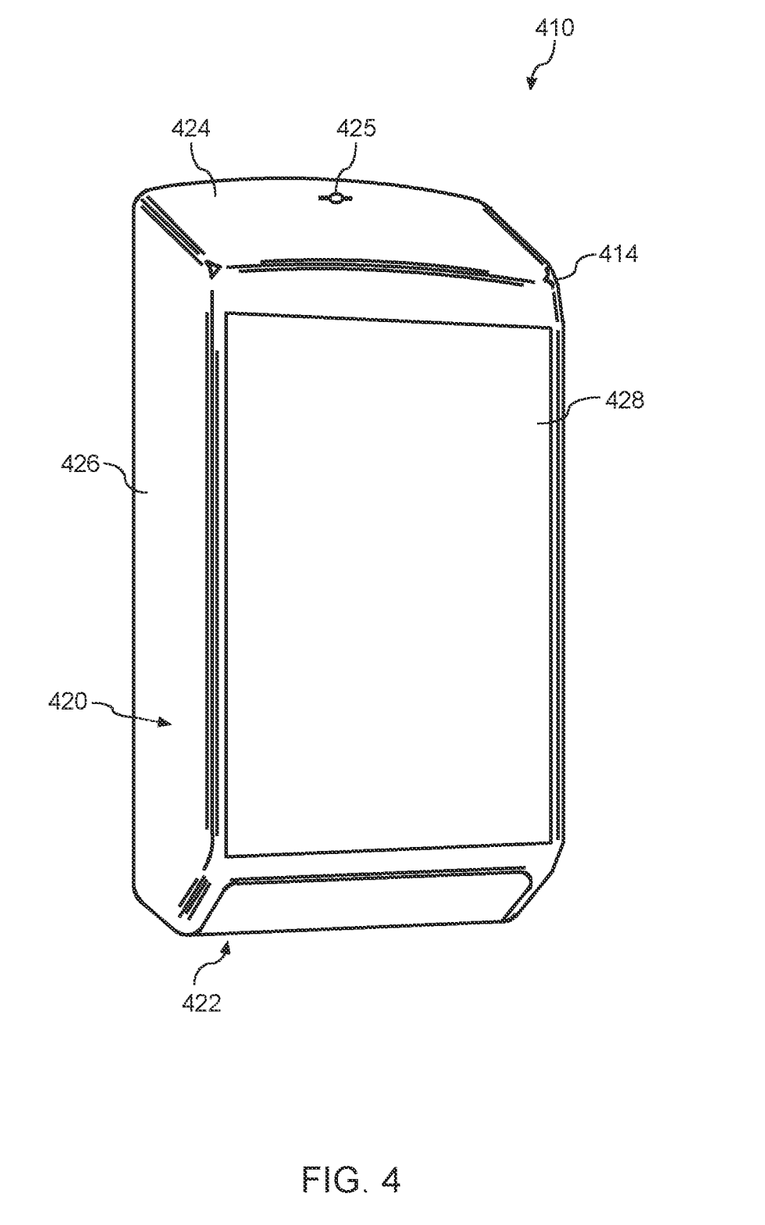
FIG. 4 depicts a perspective view of one embodiment of a dispenser with its front cover in an closed position according to example embodiments of the present disclosure.

Suitable dispensers that can include one or more sensors in accordance with the present disclosure are illustrated in FIGS. 3-4. FIGS. 3-4 illustrate a toilet tissue dispenser and a paper towel dispenser, respectively. The illustrated dispensers, as shown, are configured for dispensing paper products, such as stacked folded individual sheets of paper towels or sheets of rolled paper products, such as paper towels, toilet paper, and/or toilet tissue. While the illustrated dispenser are particularly suited for dispensing paper towels, tissues, and the like, it should be appreciated that a dispenser according to the disclosure is not limited in this regard. Indeed, the dispensers disclosed herein can refer to a paper product dispenser and/or a liquid product dispenser. Dispensers described herein can include in-counter mounted product dispensers, wall-mounted product dispensers, including dispensers mounted to the walls of bathroom stalls, and/or stand-alone product dispensers.

The dispensers will be described herein as they relate to a toilet tissue or paper towel dispenser for clarity and ease of explanation. It should also be appreciated that a dispenser according to the disclosure is not limited in its overall shape or configuration. This particular dispensers are illustrated merely as example embodiments of dispensers incorporating the features of the present disclosure.

Referring now to FIG. 3, a dispenser for a roll towel or toilet tissue dispenser is illustrated. In this case, the dispenser has a stationary back portion 138 to which a door 140 is connected. Door 140 may be opened about pivot point 142 by maintenance personnel desiring to change the product roll. Otherwise, door 140 will remain closed by a suitable latching mechanism.

Roll web product 144 is maintained inside of the dispenser housing, and is supported for rotation on a rotatable spindle 146. As shown, a rotating sensor such as a wheel 148 in this case engages the outer surface of product 144 to turn as a user pulls product tail 150. Wheel 148 is itself mounted for rotation at the distal end of a pivot arm 152, as shown. It should be understood that the rotary sensor may be any suitable device and may include one or more cylinders, wheels, discs, spheres, or the like.

Because the diameter of wheel 148 is known, its rotation will directly translate into the length of product removed. Any suitable means may be utilized to determine the rotations taken by sensor wheel 148. In the illustrated embodiment, for example, a plurality of spaced apart magnets are situated about wheel 148. The magnets are detected as the wheel rotates by a magnetic switch 156.

The information derived by wheel 148 is then converted to a data signal as described above and broadcast to a receiver and/or server system. The transmitted signal may thus include information regarding the number of pulls and the length of product removed with each pull. From this data, the total length of product used by the individual can be determined. The data signal may also include information about the rate at which the product is removed. The usage information may be transmitted immediately, or may be transmitted in batch form at predetermined times.

The embodiment illustrated in FIG. 3 further includes a door sensor arrangement to determine when door 140 is opened or closed. As described above with respect to the stall door sensors, such an arrangement may include a magnet 158 attached to door 140 for movement therewith. A stationary detector 160 attached to back portion 138 senses the presence or absence of magnet 158.

Often, roll towel dispensers may be equipped with multiple rolls, one of which is in position to dispense at any time. In some cases, janitorial personnel may replace both rolls even though one of the rolls, referred to as a stub roll, still contains some product. It will be appreciated that many embodiments of dispenser described herein can be configured to determine stub roll waste.

Referring now to FIG. 4, a dispenser 410 according to example embodiments of the present disclosure is illustrated. The dispenser 410 includes a housing 414 that is configured to hold a supply of paper product in an internal storage space 420 defined within the housing 414. The housing 414 may be formed of any suitable materials. The cover 424 is attached to the stationary components of the housing 414, and is movable to an open position wherein access is provided to the internal storage space 420 for loading additional products. The cover 424 can also include side panels 426. The cover 424 is shown in its closed position in FIG. 4 wherein the cover defines a front panel 428 of the dispenser 410. The cover 424 is releasably engaged with the stationary components of the housing by way of any locking device 425. The locking device 425 can include a conventional mechanical locking device or can include a combination electro-mechanical locking device. The cover 424 may be pivotally attached to a stationary component of the housing 414. For example, the cover 424 can pivotally attached by way of pivotal mounts. Any conventional pivotal attaching mechanism may be used in this regard. For example, in certain embodiments, a simple rotatable rod is provided and retained by rod holders. It should be appreciated that any number of conventional pivotal arrangements are known by those skilled in the art that may be utilized to pivotally mount the cover member 424.

The housing 414 includes at least one dispensing opening 422 through which the paper product is dispensed from the internal storage space 420. In the illustrated embodiment, the dispensing opening 422 is defined in the bottom the housing 414. However, the dispensing opening 422 could be located anywhere convenient for the dispensing of suitable product. For example, the dispensing opening 422 could also be defined in a bottom portion or panel member of the cover 424. The dispensing opening 422 may be disposed in any convenient location for a user to pull and dispense the individual folded sheets from the housing 414.

The dispenser can include any number of operational components housed in the housing 414 and/or located external to the housing 414. Suitable operational components can vary depending on the type of dispenser and product to be dispensed. For example, the operational components of the dispenser 410 can be mounted directly to the back panel of the housing 414 or can be part of a module that is received within the housing 414. For example, the operational components can be part of a module that may be readily removable from the housing 414 for servicing and/or replacing components without the necessity of having to remove the entire dispenser 410 from its support surface. For dispensing paper products, such as one or more rolls of sheet material, the operational components can include rollers, such as pressure rollers, drive rollers, drive motors, gear assemblies, and control circuitry, including, for example, controllers or microprocessors, for driving paper product from the roll of sheet material out through a dispensing opening. Additional roll holders, including main roll holders and stub roll holders, can also be included in the dispenser.

Additional transfer mechanisms may also be present in order to transfer dispensing between a stub roll and a main roll. Such components are known by those of skill in the art and can be incorporated accordingly herein. Additionally, tear bars or cutting bars may be present in order to cut the paper product as it is dispensed from the dispensing material. In certain embodiments, the dispenser can be configured to dispense a particular amount of sheet material. Dispensing mechanisms can be powered by batteries in a battery component or can be powered by an AC to DC distribution system.

In certain embodiments, the dispenser can be configured as a liquid product dispenser. Liquid product dispensers are suitable for dispensing a liquid product, such as hand soap, hand sanitizer, or other personal care products. While the term "liquid product" is used, the disclosure is not so limited. Indeed, the product dispensed could be a viscous liquid, such as hand soap, or a foam product, such as foamed hand soap. The disclosure is intended to cover a variety of liquid products that can be dispensed in a viscous or foamed state. Liquid product dispensers can include a variety of features and operational components including delivery spouts, motors, motor housings, pump devices, electronic sensors, control circuitry, liquid product reservoirs, delivery tubes, power supply housings, electrical contacts, battery compartments, and combinations thereof.

As disclosed, in embodiments, the dispensers can include controllers and control circuitry. The controller and control circuitry can control and monitor all the functions of the dispenser including the length of the sheet of material being dispensed, product usage, and any other activities that are occurring within the dispenser. The control circuitry can be configured to communicate information regarding the dispenser to a server system (e.g., a cloud-based management service) via wired means or through a wireless communication system as described herein. For instance, the control circuitry can include a receiver configured to interface with a dispenser and/or a server system.

In one embodiment, the dispenser can include a sensor that is designed to detect the presence of a user in a detection zone. Once the presence of a user is detected, the dispenser can be configured to automatically dispense the product, such as a sheet product or liquid product.

Figure 5:
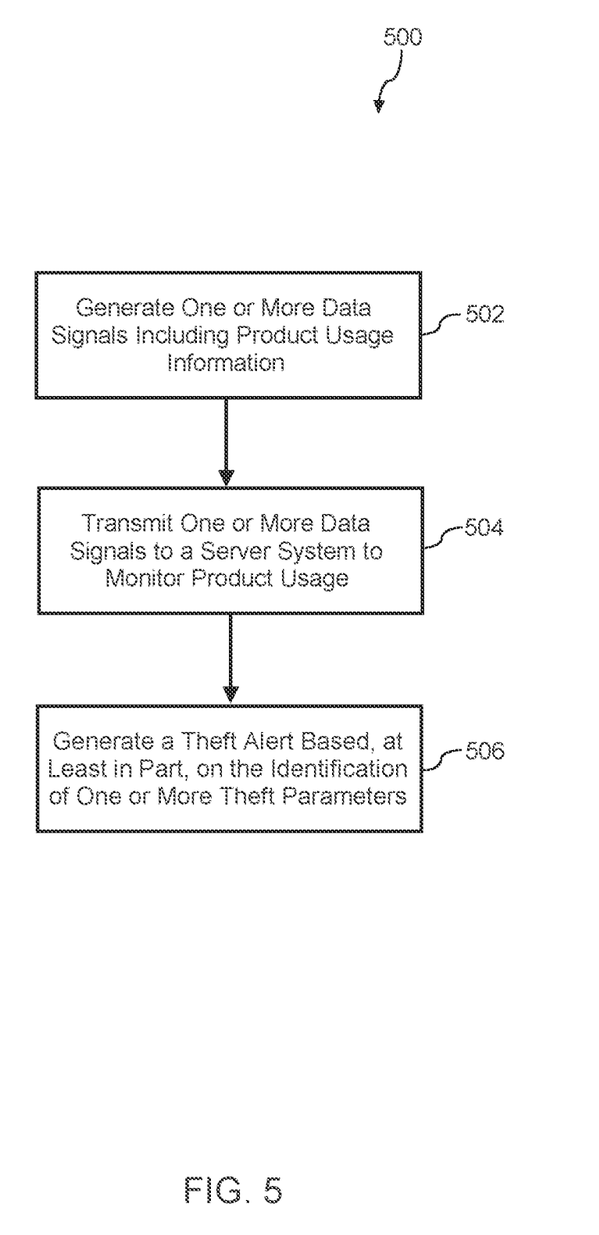
FIG. 5 depicts a block diagram of an example method 500 for detecting theft of one or more consumable products at a plurality of washroom facilities at a commercial location according to example embodiments of the present disclosure.

FIG. 5 depicts a block diagram of an example method 500 for detecting theft of one or more consumable products at a plurality of washroom facilities at a commercial location, wherein each of the washroom facilities has one or more consumable product dispensers equipped with one or more sensors. For instance, the method 500 can be implemented to manage washroom facility 12 of FIG. 1.

At 502, the method 500 can include generating one or more data signals comprising product usage information from one or more sensors disposed on one or more product dispensers. For instance, each dispenser disposed within the washroom facility can be equipped with one or more sensors capable of transmitting data signals indicative, at least in part, of product usage information.

At 504, the method can include transmitting the one or more data signals to monitor product usage of the one or more dispensers. The data signals generated from the sensors can then be transmitted to other receivers or communication units, capable of transmitting the data signals to one or more server systems. For example, the washroom facility is equipped with wireless communication capability between the sensors, other components of the dispensers, and any receivers located within the washroom. Accordingly, components of the washroom are communication-enabled and are capable of transmitting data, via a wired connection or wirelessly, to a server system. Further, components of the washroom facility (e.g., sensors) can be wirelessly connected to a server system via an suitable wireless protocol as provided herein. In such embodiments, the sensors are capable of generating and transmitting data signals directly to the server system.

As noted, the data signals can include a variety of data regarding product consumption from the respective dispenser. For example, in embodiments where the dispenser is a toilet tissue dispenser, the data signal can be generated indicating an amount of toilet paper that was removed from the roll of product. In other embodiments, where the dispenser is a soap dispenser, the data signal can include a shot count, which can be indicative of a certain amount of soap that was dispensed from the product dispenser. The server system can then utilize the data signals received to calculate an available quantity of product that remains in the dispenser. In certain embodiments, the server system can aggregate data signals over a period of time regarding product usage in order to establish a usage rate (e.g., a normal usage rate) for the respective dispenser. In such embodiments, the server system is capable of aggregating data signals in order to monitor product usage from each dispenser and can further store data regarding such product usage on one or more files. As noted, product usage rates can be categorized as normal, referring to a product usage rate that is within parameters observed by the server system for use of product over time, or outside the range of normal, indicative of product usage that is exceedingly above or below the normal product usage rate for the particular dispenser.

At 506, the method can include generating a theft alert based, at least in part, on the identification of one or more theft parameters. For example, as the server system is collecting, analyzing, and aggregating data signals from the sensors, the server system can further compare one or more of the incoming data signals with theft parameters that are stored on the server system. Such theft parameters can include conditions that, once identified by the server system, indicate that a theft has likely occurred, which triggers the server system to generate and transmit a theft alert. Examples of theft parameters include identification of a product usage rate that is at least three times faster than a normal usage rate for the respective dispenser. Further theft parameters include identification of a dispenser having an available product quantity of zero or identification of a dispenser having a product usage rate outside of the normal usage range when the commercial establishment is closed. Additional theft parameters can be input into the server system as required.

The theft alert can be transmitted to any suitable device, including peripheral devices (e.g., smartphones or tablets). The theft alert can include the approximate time that the theft occurred and can further identify the particular washroom and dispenser from which the theft occurred. The theft alert can be transmitted via one or more wired or wireless protocols, including, but not limited to, cellular services (e.g., 4G Long-Term Evolution (LTE), 5G, etc.).

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A system for detecting theft of one or more consumable products at a plurality of washroom facilities at a commercial location, said system comprising:
   one or more product dispensers within each of the washroom facilities that require periodic refill of a consumable product;
   a sensor configured with each of the product dispensers configured to monitor an amount of product consumed from the product dispenser and to generate one or more data signals comprising product usage information;
   a server system configured to receive the one or more data signals and to monitor product usage of the one or more product dispensers based, at least in part, on the one or more data signals, the server system further configured to generate a theft alert upon identification of one or more theft parameters, wherein the one or more theft parameters comprise identification of a product usage rate that is an atypical product usage rate that is outside of a range of a normal usage rate for the one or more product dispensers, wherein the normal usage rate is determined from historical data for an identified dispenser, and
   wherein the server is system is configured to transmit the theft alert to one or more peripheral devices and is configured to disable the identified dispenser.

2. The system of claim 1, wherein the atypical product usage rate is at least 1.5 times faster than a normal usage rate.

3. The system of claim 1, wherein the atypical product usage rate is at least 3 times faster than a normal usage rate.

4. The system of claim 1, wherein the one or more theft parameters comprises identification of one or more product dispensers having an available product quantity of zero.

5. The system of claim 1, wherein the one or more theft parameters comprises identification of the atypical product usage rate during a time in which the commercial location is closed.

6. The system of claim 1, wherein the one or more theft parameters comprises identification of one or more product dispensers that are not timely refilled.

7. The system of claim 1, wherein the theft alert includes an identity and a location of the one or more product dispensers.

8. The system of claim 1, wherein the theft alert includes a proposed time of theft.

9. The system of claim 1, wherein the server system is configured to store product usage information from the one or more product dispensers and to generate a normal usage rate for each of the one or more product dispensers.

10. The system of claim 1, wherein the one or more product dispensers are configured to implement a wireless protocol to transmit the one or more data signals.

11. The system of claim 10, wherein the wireless protocol comprises at least one of: Blue Tooth Low Energy, Long Range (LoRa), Near Field Communication (NFC), High-Frequency (HF) RFID, Ultra-High Frequency (UHF) RFID, Ultra-wideband (UWB), Institute of Electrical and Electronics Engineers (IEEE) 802.15.4, Thread, Zigbee, or Wirepass.

12. The system of claim 1, wherein the consumable product comprises toilet paper or paper towels.

13. A method for detecting theft of one or more consumable products at a plurality of washroom facilities at a commercial location, said method comprising:
   generating one or more data signals comprising product usage information from one or more sensors disposed on one or more product dispensers;
   transmitting the one or more data signals to a server system to monitor product usage of the one or more product dispensers; and
   generating a theft alert based, at least in part, on the identification of one or more theft parameters, wherein the one or more theft parameters comprises identification of a product usage rate that is an atypical product usage rate for the product dispenser that is outside of a normal of a range of normal usage rate, wherein a normal usage rate is determined from historical data for an identified dispenser,
   wherein the server is system is configured to transmit the theft alert to one or more peripheral devices and is configured to disable the identified dispenser.

14. The method of claim 13, wherein the atypical product usage rate is at least 1.5 times faster than a normal usage rate.

15. The method of claim 13, wherein the atypical product usage rate is at least 3 times faster than a normal usage rate.

16. The method of claim 13, wherein the one or more theft parameters comprises identification of one or more product dispensers having an available product quantity of zero.

17. The method of claim 13, wherein the one or more theft parameters comprises identification of the atypical product usage rate during a time in which the commercial location is closed.

18. The method of claim 13, wherein the one or more theft parameters comprises identification of one or more product dispensers that are not timely refilled.

19. The method of claim 13, wherein the theft alert includes an identity and a location of the one or more product dispensers.

* * * * *